United States Patent [19]
Sechrist et al.

[11] Patent Number: 5,824,619
[45] Date of Patent: Oct. 20, 1998

[54] PARTICULATE COOLING PROCESS WITH REDUCED THERMAL CHANNELING

[75] Inventors: Paul A. Sechrist, Des Plaines; Roger R. Lawrence, Elmhurst; Frank T. Micklich, Joliet, all of Ill.

[73] Assignee: UOP, Des Plaines, Ill.

[21] Appl. No.: 610,561

[22] Filed: Mar. 6, 1996

Related U.S. Application Data

[63] Continuation of Ser. No. 241,874, May 12, 1994, abandoned.

[51] Int. Cl.[6] .................................................. B01J 3/04
[52] U.S. Cl. .............................. 502/34; 502/35; 502/38; 502/56; 34/394; 34/395
[58] Field of Search ................... 502/34, 35, 38, 502/56; 34/391, 394, 395

[56] References Cited

U.S. PATENT DOCUMENTS

| | | | |
|---|---|---|---|
| 2,696,461 | 12/1954 | Howard | 196/52 |
| 2,908,636 | 10/1959 | Steffgen et al. | 208/140 |
| 2,965,563 | 12/1960 | Steffgen et al. | 208/140 |
| 3,647,680 | 3/1972 | Greenwood et al. | 208/65 |
| 3,652,231 | 3/1972 | Greenwood et al. | 23/288 G |
| 3,692,496 | 9/1972 | Greenwood et al. | 23/288 G |
| 3,701,203 | 10/1972 | Anderson | 34/170 |
| 3,986,982 | 10/1976 | Crowson et al. | 252/415 |
| 4,621,069 | 11/1986 | Ganguli | 502/45 |
| 4,647,549 | 3/1987 | Greenwood | 502/37 |
| 4,664,778 | 5/1987 | Reinkemeyer | 208/113 |
| 4,687,637 | 8/1987 | Greenwood | 422/62 |
| 4,701,429 | 10/1987 | Greenwood | 502/37 |

OTHER PUBLICATIONS

"The Phenomenon of Thermal Channeling in Countercurrent Gas–Solid Heat Exchangers" by: E.P. Wanchala and J. R. Wynnyckyj, published in *The Canadian Journal of Chemical Engineering* vol. 65, Oct. 1987 (pp. 736–743).

*Primary Examiner*—Helane Myers
*Assistant Examiner*—Alexander G. Ghyka
*Attorney, Agent, or Firm*—Thomas K. McBride; John G. Tolomei; Michael A. Moore

[57] ABSTRACT

A regeneration process is described that eliminates or greatly reduces thermal channelling in a cooling zone bed. The method controls the flow rate of cooling gas independently of the requirements of the regeneration process for combusting coke and for halogenating or drying the catalyst. In one embodiment, a portion of a cooling stream is bypassed around a cooling zone and then passed to a drying zone. In another embodiment, one portion of a cooling stream from a cooling zone is vented, and another portion of the stream is passed to a drying zone.

16 Claims, 1 Drawing Sheet

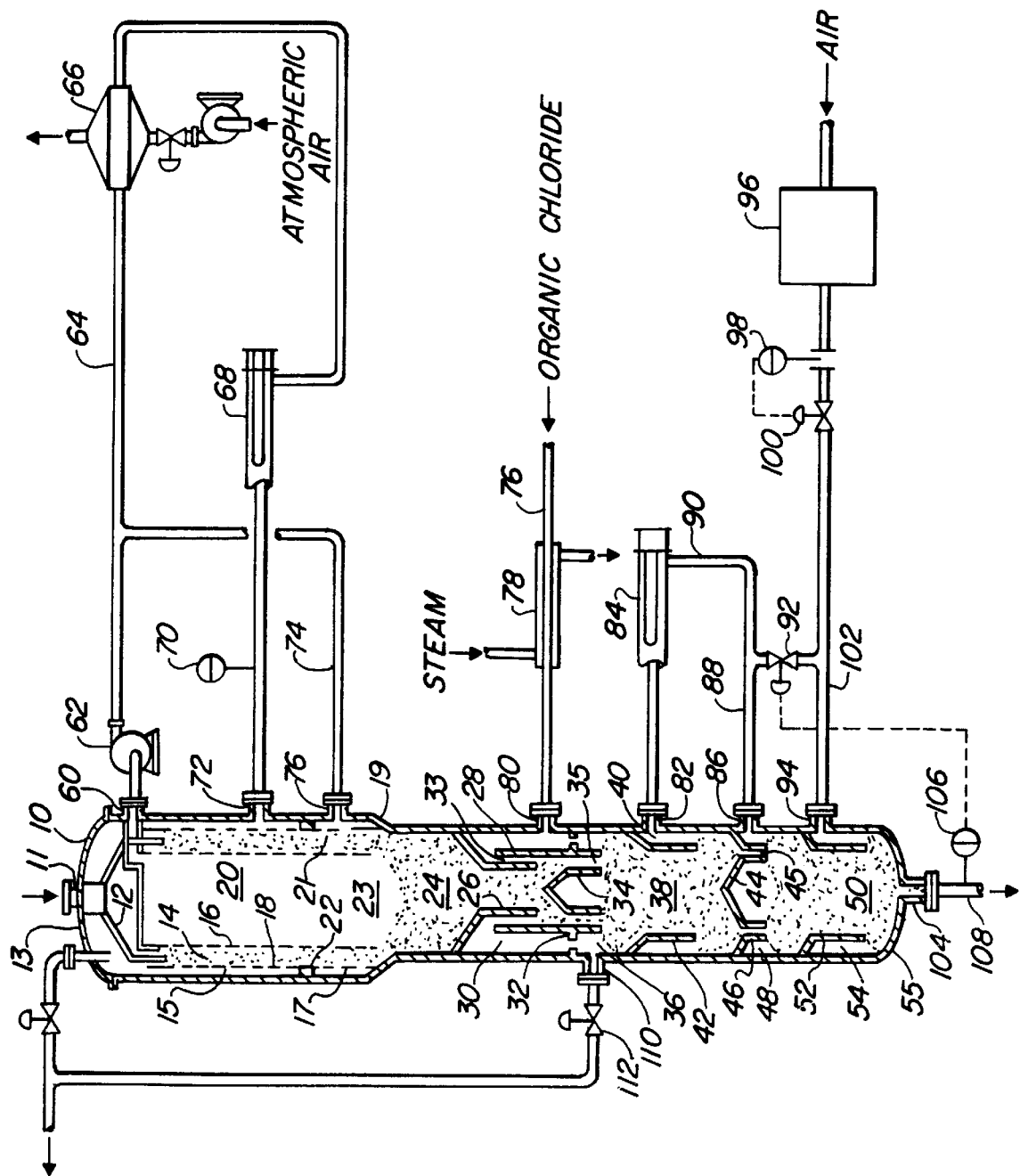

5,824,619

PARTICULATE COOLING PROCESS WITH REDUCED THERMAL CHANNELING

CROSS REFERENCE to RELATED APPLICATION

This application is a continuation-in-part of prior copending application 08/241,874, filed May 12, 1994, now abandoned.

FIELD OF THE INVENTION

This invention relates to the art of catalytic conversion of hydrocarbons to useful hydrocarbon products. More specifically, it relates to the reconditioning of spent hydrocarbon conversion catalyst so that the catalyst can be reused in a hydrocarbon conversion reaction.

BACKGROUND OF THE INVENTION

Catalytic processes for the conversion of hydrocarbons are well known and extensively used. Invariably the catalysts used in these processes become deactivated for one or more reasons. Where the accumulation of coke deposits causes the deactivation, reconditioning of the catalyst to remove coke deposits restores the activity of the catalyst. Coke is normally removed from catalyst by contact of the coke-containing catalyst at high temperature with an oxygen-containing gas to combust and remove the coke in a regeneration process. These processes can be carried out in-situ or the catalyst may be removed from a vessel in which the hydrocarbon conversion takes place and transported to a separate regeneration zone for coke removal. Arrangements for continuously or semi-continuously removing catalyst particles from a reaction zone and for coke removal in a regeneration zone are well known.

In continuous or semi-continuous regeneration processes, coke-laden particles are added and withdrawn from a regeneration zone. In order to combust coke in a typical regeneration zone, coke-containing catalyst particles are contacted with an oxygen-containing recycle gas in a combustion section. Coke combustion is regulated by controlling a low oxygen concentration in the recycle gas. Most of the flue gas, which contains the by-products of coke combustion, is continuously recirculated and forms at least a portion of the recycle gas. A small stream of makeup gas is added to the recycle gas to replace oxygen consumed in the combustion of coke and a small amount of flue gas is vented off to allow for the addition of the makeup gas.

After coke burning, the catalyst requires reconditioning to restore the noble metal, usually platinum, to its most highly catalytic state and to replace chloride on the catalyst that may be lost in the reaction zone or through the regeneration process. Reconditioning for a reforming catalyst will include contact with oxygen and a chlorine-containing compound to redisperse and oxidize the platinum metal and to replace the chloride on the catalyst, followed by a drying step to reduce the moisture content of the catalyst. Alternatively, the reconditioning will involve reversing the order of the redispersion and drying steps. Finally, the catalyst is contacted with hydrogen to change the platinum metal from various oxidized states to a reduced metallic condition.

Prior to the reduction step, it is usual practice to cool the catalyst in a cooling zone. Cooling may be accomplished by passing the catalyst through a cooling vessel containing coils through which cooling water flows. Alternatively, cooling without the use of cooling water may be accomplished by countercurrently contacting the catalyst with a cool gas, such as dried cooled air. After having been heated by the catalyst, the air stream leaving the cooling zone may be used in some or all of the previously-described regeneration steps, including drying, redispersion, and coke combustion.

One of the problems with continuous catalyst regeneration processes is a phenomenon called speckling. Speckling refers to the mottled or speckled appearance of oxidized-metal catalyst particles that have undergone multiple regenerations. It has been observed that the presence of catalyst particles of various shades of color is symptomatic of a general degradation of the physical properties of the catalyst particles, the metal in particular. And it has been observed that performance problems in the reaction section are associated with this speckled appearance. It is believed that the metal has become degraded in the sense that the metal on the catalyst is either not uniformly dispersed or not in a uniform oxidation state. But it has been unknown for a long time why the catalyst particles take on this appearance after multiple regenerations.

INFORMATION DISCLOSURE

U.S. Pat. No. 3,652,231 (Greenwood et al.) shows regeneration apparatus in which a constant-width movable bed of catalyst is utilized. The '231 patent also describes a continuous catalyst regeneration process which is used in conjunction with catalytic reforming of hydrocarbons. U.S. Pat. No. 3,647,680 (Greenwood et al.) and U.S. Pat. No. 3,692,496 (Greenwood et al.) also deal with regeneration of reforming catalyst. The teachings of patents ('231, '680, and '496) are hereby incorporated in full into this patent application.

U.S. Pat. No. 4,647,549 (Greenwood) discloses a regeneration method and apparatus in which an air stream is introduced into the bottom of a regeneration vessel and is heated by exchange of heat with catalyst, thereby effecting cooling of the catalyst. Before passing into a drying zone and then into a combustion zone, the air stream is heated further by heating means located in the regeneration vessel.

Thermal channelling is described in the article by E. P. Wonchala and J. R. Wynnyckyj entitled, "The Phenomenon of Thermal Channelling in Countercurrent Gas-Solid Heat Exchangers," published in The Canadian Journal of Chemical Engineering, Volume 65, October 1987, Pages 736–743.

U.S. Pat. No. 2,696,461 issued to Howard discloses a fluidized catalyst regeneration process that employs a fluidized catalyst cooling zone.

U.S. Pat. Nos. 2,908,636 and 2,965,563 issued to Steffgen et al. disclose basic steps for the regeneration of reforming catalyst.

U.S. Pat. No. 3,701,203 issued to Anderson discloses a method for drying heat-sensitive particles in a moving bed tower that comprises a preheat zone, a steep zone, a drying zone, another steep zone, and a cooling zone.

U.S. Pat. No. 3,986,982 issued to Crowson et al. teaches the completion of reforming catalyst regeneration with a final reduction step.

U.S. Pat. No. 4,621,069 issued to Ganguli discloses a catalyst regeneration process in which hot regenerated catalyst is cooled by indirect heat exchange.

U.S. Pat. No. 4,664,778 issued to Reinkemeyer discloses a catalyst regeneration process in which the oxygen source for the catalyst regeneration step is cooled.

U.S. Pat. Nos. 4,687,637 and 4,701,429 issued to Greenwood disclose a continuous regeneration apparatus and process in which the amount of air supplied to a combustion zone is adjusted independently of the air supplied to a drying zone.

SUMMARY OF THE INVENTION

It has now been recognized that speckling of oxidized catalyst particles may be caused by non-uniform cooling of catalyst particles in continuous regeneration processes. We have recognized that variations in thermal exposure in a cooling zone may affect catalyst properties. This invention is a method of obtaining catalyst particles that have been uniformly exposed to thermal conditions and have been uniformly cooled to a desired degree. With our invention, not only is the desired bulk or average temperature of all the catalyst particles exiting the cooling zone achieved, but also uniformity of temperature among individual catalyst particles is also achieved.

In its broadest aspect, this invention is a method of cooling particles that leave a zone by using a stream that is to be heated before it enters the zone from which the particles leave. More specifically, in a catalyst regeneration process, this invention is a method of operating a cooling zone by bypassing a portion of a cooling stream around the cooling zone and passing it through a drying zone. Also, in a catalyst regeneration process, this invention is a method of operating a cooling zone by venting one portion of a cooling stream after it has passed through the cooling zone, and passing another portion of the stream into a drying zone. This invention obtains proper and independent flow rates through the cooling zone and the drying zone, avoids non-uniform flow patterns in the cooling zone, and results in uniform cooling in the cooling zone.

We have recognized that regeneration processes of the prior art that employ a drying zone and a cooling zone are especially likely to have variations in thermal exposure of catalyst particles that can lead to speckling. In processes of the prior art, the flow rate of the cool air stream to the cooling zone is a rate that is determined by the flow requirements elsewhere in the regeneration process, such as the flow rate that is required either for drying or for coke combustion, whichever is greater.

We have recognized that the flow rates of air typically used for drying or for coke combustion are usually not suitable for cooling the reconditioned catalyst particles because those flow rates typically cause thermal channelling in the cooling zone bed. Thermal channelling is a phenomenon that appears in countercurrent cooling of hot, moving packed beds. It arises because the resistance to the flow of gas through the moving packed bed decreases with decreasing temperature. Within a moving packed bed, once a colder region with respect to the remainder of the bed is established somehow, it becomes the favored flow channel by virtue of its lower resistance to flow. Within the moving packed bed, some vertical regions or channels of relatively-high flow and other channels of relatively-low flow are established.

Thermal channelling can cause two undesirable effects: it can reduce heat transfer efficiency and it can affect the properties of the catalyst. The heat transfer efficiency is reduced, regardless of the catalyst surface area that is available for heat transfer. The gas passing up through the relatively-high flow channel can absorb by heat exchange only the thermal mass of the catalyst that is passing downward through that channel. Likewise, the catalyst that is passing down through the relatively-low flow channel can absorb by heat exchange only the thermal mass of the gas that is passing upward through that channel. Therefore, thermal channelling will always cause an observed loss in thermal efficiency. Second, the properties of the catalyst particles can be affected because some catalyst particles may be exposed to high temperature for longer periods of time than other catalyst particles, even though the average amount of time that the catalyst particles are in the cooling zone may be the same. Variations in the periods of time that individual catalyst particles are exposed to high temperatures can affect properties of the catalyst, such as metal dispersion, moisture content or chloride content, and changes in any of these properties can adversely affect the performance of the catalyst in the reaction zone.

This invention is most suitable for particles and gases having respective flow rates that are related such that the thermal flow rates of the particles and the gases are nearly equal. Thermal flow rate is defined as the product of mass flow rate and the average heat capacity through the operating temperature range. Thus, the thermal flow rate of the particle stream is the product of the mass flow rate of the particle stream and the average heat capacity of the particle stream. Likewise, the thermal flow rate of the gas stream is the product of the mass flow rate of the gas stream and the average heat capacity of the gas stream. Where mass flow rate is measured in units of pound/hour and heat capacity is measured in units of BTU/pound/°F., then the units of thermal flow rate are BTU/hour/°F. See the article by E. P. Wonchala and J. R. Wynnckyj entitled, "The Phenomenon of Thermal Channelling in Countercurrent Gas-Solid Heat Exchangers," published in The Canadian Journal of Chemical Engineering, Volume 65, October 1987, at pages 736–743, the teachings of which are incorporated herein by reference. For purposes of this discussion, it is convenient to define a thermal flow ratio, which is the ratio of the thermal flow rate of a first stream divided by the thermal flow rate of a second stream. The thermal flow ratio has dimensionless units, because the units of the thermal flow rates in both the numerator and the denominator of the ratio are the same.

For a given imposed pressure difference across a moving packed bed of solids that is to be cooled by countercurrent gas flow, if the overall, or average, thermal flow ratio of the gas to solid through the bed is equal to 1, the previously-mentioned article by Wonchala and Wynnyckyj explains that it is unlikely that the entire moving packed bed operates at a thermal flow ratio of gas to solid equal to 1. Instead, the gas distributes itself into channels, each occupying a fraction of the total cross-section of the bed. Some of the channels have a relatively-low gas flow and, hence, a relatively-low thermal flow ratio (e.g., below 0.65), while other channels have a relatively-high gas flow and thermal flow ratio (e.g., above 1.3). The rate of cooling and even the extent of cooling thus varies greatly from one channel to another. The pressure drop from channel to channel remains the same despite differences in channel flow rates because the physical flow properties of the gas vary with temperature.

Only particular pairs of gases and solids flowing countercurrently for the purpose of cooling the solids result in a combination of flow rates and heat capacities such that the thermal flow ratio of gas to solid is equal to 1. One common situation where this arises is in processes for the removal of coke by combustion from spent catalyst particles in hydrocarbon conversion processes. The catalyst particles are typically solid particles comprised of a base material containing alumina, silica, or silica-alumina. By silica-alumina it is meant the wide variety of amorphous and crystalline combinations of silicon, aluminum, and oxygen atoms that form solids, including clays and zeolites. The catalyst particles may also comprise coke, which may typically be 1–25 wt-%, or more, of the weight of catalyst particles in use in hydrocarbon conversion processes. The gases that contact these catalyst particles are typically air, molecular oxygen, and molecular nitrogen.

In these catalyst regeneration processes, the ratio of flow rates of gas to solids that is required to provide makeup gas to combust coke from spent catalyst particles, to dry the catalyst particles after coke combustion, and even to redisperse and oxidize the metal on the catalyst typically includes a range in which the thermal flow ratio of gas to solid is 1.0. Despite variations in the amount and composcatalyst, this is on the catalyst, and on the properties of the catalyst, this is true for a wide range of commercially-important catalysts that can undergo continuous regeneration.

This invention is not limited to processes that employ catalysts comprising silica, alumina, and silica-alumina. It is believed that this invention is also applicable to processes that employ catalysts comprising titanium oxide, phosphoric acid, zirconium oxide, tin oxide, etc. Moreover, this invention is not limited to processes that employ cooling gases that comprise oxygen and nitrogen. This invention is also applicable to processes that employ hydrogen-containing gases or hydrocarbon-containing gases for cooling catalyst particles, such as in cooling coke-containing catalyst particles that are withdrawn from hydrocarbon-processing reactors. Preferably, the cooling fluid absorbs only sensible heat in the cooling zone. For example, if the cooling fluid comprises a liquid, then liquid does not vaporize in the cooling zone.

The present invention provides a method of reactivating a catalyst that has been deactivated by the accumulation of coke on its surface, that requires regeneration to remove coke, and that needs cooling of the catalyst to provide adequate catalytic performance. The present invention is particularly suited for catalysts that use platinum metals and maintain a chloride concentration on the catalyst particles. For such catalyst particles, the arrangement and operation of this method and apparatus will improve the cooling of the catalyst particles.

In a broad embodiment, this invention is a method for cooling particles. Particles are withdrawn from a first zone and passed at least periodically to a second zone. In the second zone a packed bed of the particles is formed. The bed is moved at least periodically to establish a particle thermal flow rate. A first portion of a first gas stream is passed through the bed, thereby cooling the particles and producing a heated first portion. The first portion of the first gas stream contacts the particles in the bed at a gas flow rate that establishes a gas thermal flow rate such that the ratio of the gas thermal flow rate to the particle thermal flow rate in the bed is less than about 0.9 or more than about 1.15. The heated first portion of the first gas stream is withdrawn from the second zone and is combined with a second portion of the first gas stream to form a second gas stream. The second gas stream is heated to produce a heated second gas stream. The heated second gas stream is passed to the first zone and contacts the particles in the first zone. Cooled particles are withdrawn at least periodically from the second zone.

In another embodiment, this invention is a method for cooling particles. Particles are withdrawn from a first zone. The particles are passed at least periodically to a second zone. In the second zone, a packed bed of the particles is formed. The bed is moved at least periodically to establish a particle thermal flow rate. A first gas stream is passed through the bed, thereby cooling the particles and producing a heated first gas stream. The first gas stream contacts the bed at a gas flow rate that establishes a gas thermal flow rate such that the ratio of the gas thermal flow rate to the particle thermal flow rate in the bed is less than about 0.9 or more than about 1.15. The heated first gas stream is withdrawn from the second zone. The heated first gas stream is heated to produce a twice-heated first gas stream, which is passed to the first zone where the twice-heated first gas stream contacts the particles in the first zone. Cooled particles are withdrawn at least periodically from the second zone.

In a more detailed embodiment, this invention is a method for effecting regeneration of catalyst particles used in hydrocarbon conversion reactions. Catalyst particles are passed through a burn zone by means of gravity. The burn zone is maintained at a coke-oxidizing temperature, wherein catalyst particles are contacted with a recycle gas comprising oxygen. The catalyst particles are passed from the burn zone through a catalyst drying zone by means of gravity. In the catalyst drying zone, water is removed from the catalyst particles. The catalyst particles are passed from the catalyst drying zone to a catalyst cooling zone by means of gravity. In the catalyst cooling zone, a packed cooling bed of the particles is formed, and the temperature of the catalyst particles is reduced. The catalyst particles are moved at least periodically through the burn zone, the catalyst drying zone, and the catalyst cooling zone by withdrawing catalyst particles from the catalyst cooling zone and adding catalyst particles to the burn zone, thereby establishing a catalyst thermal flow rate in the catalyst cooling zone. Air drawn from the atmosphere is compressed to an elevated pressure to produce a compressed air stream. The compressed air stream is cooled and passed through an air drying zone. In the air drying zone, water is removed from the compressed air stream, thereby producing a dried air stream. A first portion of the dried air stream is passed through the cooling bed, thereby cooling the catalyst particles and producing a heated air stream. The catalyst particles in the cooling bed are contacted with the first portion of the dried air stream at an air flow rate that establishes an air thermal flow rate such that the ratio of the air thermal flow rate to the catalyst thermal flow rate in the cooling bed is less than 0.9 or more than 1.15. The heated air stream from the catalyst cooling zone is combined with a second portion of the dried air stream to form a combined stream. The combined stream in heated in an air heating zone. At least a portion of the combined stream from the air heating zone is passed through the catalyst drying zone, thereby removing water from the catalyst particles. At least a portion of the gas from the catalyst drying zone is mixed with gas exiting from the catalyst particles in the burn zone to form a flue gas stream. The flue gas stream is withdrawn from the burn zone. A first portion of the flue gas stream is discharged from the process. A second portion of the flue gas stream is passed to the burn zone, thereby providing at least a portion of the recycle gas.

Other objects and embodiments of this invention are discussed in the following detailed description.

BRIEF DESCRIPTION OF THE DRAWING

The drawing is a schematic illustration of a regeneration zone arranged in accordance with this invention and some of the equipment associated therewith.

DETAILED DESCRIPTION OF THE INVENTION

In its broadest aspect, this invention may be used to cool any particles leaving a zone by using a stream that is to be heated before it enters the zone from which the particles are withdrawn. The particles leaving the zone are directly and countercurrently contacted with the gas stream in order to cool the particles and to return to the zone the heat that is recovered from the particles. Particles that are suitable for use in this invention will normally comprise geometric shapes of regular size. In most cases, the particles will have a maximum dimension of less than ½ inch. Gases that are suitable for use in this invention will be cooled gases which can exchange heat directly with the withdrawn particles without adversely affecting the particles. When heated, suitable gases will also not be detrimental to the operation or performance of the zone from which the particles are withdrawn. Preferably, the stream of heated gases that enters the zone is a stream that is required for the operation and performance of the zone.

The present invention is applicable to a wide variety of hydrocarbon conversion processes including hydrogenation and dehydrogenation processes, but the most widely practiced hydrocarbon conversion process to which the present invention is applicable is catalytic reforming. Therefore the discussion of the invention contained herein will be in reference to its application to a catalytic reforming reaction system. It is not intended that such discussion limit the scope of the invention as set forth in the claims.

Catalytic reforming is a well-established hydrocarbon conversion process employed in the petroleum refining industry for improving the octane quality of hydrocarbon feedstocks, the primary product of reforming being motor gasoline. The art of catalytic reforming is well known and does not require detailed description herein.

Briefly, in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 180° F. and an end boiling point of about 400° F. The catalytic reforming process is particularly applicable to the treatment of straight run gasolines comprised of relatively large concentrations of naphthenic and substantially straight chain paraffinic hydrocarbons, which are subject to aromatization through dehydrogenation and/or cyclization reactions.

Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information on reforming processes may be found in, for example, U.S. Pat. No. 4,119,526 (Peters et al.); U.S. Pat. No. 4,409,095 (Peters); and U.S. Pat. No. 4,440,626 (Winter et al.).

A catalytic reforming reaction is normally effected in the presence of catalyst particles comprised of one or more Group VIII noble metals (e.g., platinum, iridium, rhodium, palladium) and a halogen combined with a porous carrier, such as a refractory inorganic oxide. The halogen is normally chlorine. Alumina is a commonly used carrier. The preferred alumina materials are known as the gamma, eta and theta alumina with gamma and eta alumina giving the best results. An important property related to the performance of the catalyst is the surface area of the carrier. Preferably, the carrier will have a surface area of from 100 to about 500 $m^2/g$. The particles are usually spheroidal and have a diameter of from about ¹⁄₁₆th to about ⅛th inch (1.5–3.1 mm), though they may be as large as ¼th inch (6.35 mm). In a particular regenerator, however, it is desirable to use catalyst particles which fall in a relatively narrow size range. A preferred catalyst particle diameter is ¹⁄₁₆th inch (3.1 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be reconditioned, or regenerated, before it can be reused in a reforming process.

In preferred form, the reformer will employ a moving bed reaction zone and regeneration zone. The present invention is applicable to a moving bed regeneration zone and a fixed bed regeneration zone. Fresh catalyst particles are fed to a reaction zone, which may be comprised of several subzones, and the particles flow through the zone by gravity. Catalyst is withdrawn from the bottom of the reaction zone and transported to a regeneration zone where a hereinafter described multi-step regeneration process is used to recondition the catalyst to restore its full reaction promoting ability. Catalyst flows by gravity through the various regeneration steps and then is withdrawn from the regeneration zone and furnished to the reaction zone. Movement of catalyst through the zones is often referred to as continuous though, in practice, it is semi-continuous. By semi-continuous movement is meant the repeated transfer of relatively small amounts of catalyst at closely spaced points in time. For example, one batch per minute may be withdrawn from the bottom of a reaction zone and withdrawal may take one-half minute, that is, catalyst will flow for one-half minute. If the inventory in the reaction zone is large, the catalyst bed may be considered to be continuously moving. A moving bed system has the advantage of maintaining production while the catalyst is removed and replaced.

Referring to the drawing, the invention is illustrated in association with a section 10 of a cylindrical catalyst regeneration tower. Looking first at the flow of catalyst particles, upper nozzle 11 passes through the upper head 13 of regeneration tower 10. The upper nozzle 11 distributes catalyst particles generally uniformly through a plurality of conduits 12 into an upper annular catalyst particle bed 14 formed by an outer catalyst particle retention screen 18 and an inner catalyst particle retention screen 16. The upper annular catalyst particle bed 14, called the burn zone bed, is located above the elevation of a baffle 22, which is attached to the wall of the regeneration tower 10 and is located outside of the outer catalyst particle retention screen 18. The upper annular catalyst particle bed 14 discharges into a lower annular catalyst particle bed 21, which is located below the elevation of the baffle 22 and is also formed by the outer catalyst particle retention screen 18 and the inner catalyst particle retention screen 16. Baffle 22 segregates the gas streams that flow into and through the upper annular catalyst particle bed 14 and the lower annular catalyst particle bed 21, which is called the reheating zone bed. Burning of carbon off the catalyst particles occurs in the upper annular catalyst particle bed 14, and reheating the catalyst particles to the desired temperature for halogenation occurs after carbon burning and prior to halogenation in the lower annular catalyst particle bed 21.

In this embodiment, catalyst particle retention screens 16 and 18 ar cylindrical in form and concentric with the center line of regeneration vessel 10. Retention screens 16 and 18 are perforated with holes that are large enough to allow gas to pass through the annular catalyst bed but do not permit the passage of catalyst particles therethrough. Outer catalyst particle retention screen 18 extends downward from the bottom of conduits 12 to a swedge section 19 of regeneration vessel 10. Inner catalyst particle retention screen 16 is attached to the top head 13 of regeneration vessel 10 and extends downward therefrom to a point slightly above the lower end of outer catalyst particle retention screen 18. The bottom of the lower annular catalyst particle bed 21 is open to allow catalyst particles to empty from the catalyst bed into a halogenation zone bed 24 in a central portion of regeneration vessel 10. The annular catalyst bed transforms into a cylindrical shape as it passes into the halogenation zone bed 24.

Halogenation of the catalyst particles occurs in the halogenation zone bed 24. The upper portion of the bed 24 is formed by the wall of the regeneration vessel 10, and the lower portion of the bed 24 is formed by a baffle 26 that comprises an upper frusto-conical section and a lower vertical, cylindrical section. The lower portion of the bed 24 is open to allow catalyst particles to empty from the catalyst bed into a cylindrical bed 38, called the drying zone bed. In this embodiment, the catalyst particles reach cylindrical bed 38 from cylindrical bed 24 by passing through an annular bed 35 formed between an annular baffle 28 and a central baffle 34. Annular baffle 28 is cylindrical in form and concentric with the center line of regeneration vessel 10. Central baffle 34 comprises an upper conical section and a lower cylindrical section, and central baffle 34 is concentric with the center line of regeneration vessel 10. Horizontal conduits, not shown in the drawing, provide communication for gas between the annular space 36 and the space that is above the catalyst bed 38 and beneath the central baffle 34. These horizontal conduits do not significantly interfere with the flow of catalyst through the annular bed 35.

Drying of the catalyst particles occurs in the drying zone bed 38. The structural design of the bed 38 is in many respects the same as that of the bed 24. The upper portion of the bed 38 is formed by the wall of the regeneration vessel 10, and the lower portion of the bed 38 is formed by a baffle 42 that comprises an upper frusto-conical section and a lower vertical, cylindrical section. The lower portion of the bed 38 is open to allow catalyst particles to empty from the catalyst bed into a cylindrical bed 50, called the cooling zone bed. In this embodiment, the catalyst particles reach cylindrical bed 50 from cylindrical bed 38 by passing through an annular bed 45 formed between an annular 46 and a central baffle 44. Annular baffle 46 comprises an upper frusto-conical section and a lower vertical, cylindrical section, and annular baffle 46 is concentric with the center line of regeneration vessel 10. Central baffle 44 comprises an upper conical section and a lower cylindrical section, and central baffle 44 is concentric with the center line of regeneration vessel 10. Horizontal conduits, not shown in the drawing, provide communication for gas between the annular space 48 and the space that is above the catalyst bed 50 and beneath the central baffle 44. These horizontal conduits do not significantly interfere with the flow of catalyst through the annular bed 35.

Cooling of the catalyst particles occurs in the cooling zone bed 50. The structural design of the bed 50 is essentially the same as that of the bed 38. The upper portion of the bed 38 is formed by the wall of the regeneration vessel 10, and the lower portion of the bed 38 is formed by a baffle 52 that comprises an upper frusto-conical section and a lower vertical, cylindrical section. The lower portion of the bed 50 is open to allow catalyst particles to empty from the catalyst bed and into an outlet nozzle 104. The catalyst particles leave the regeneration tower 10 through a conduit 108. A temperature sensor/controller 106 measures the temperature of the catalyst particles in the conduit 108. The catalyst particles in the bed 50 are statically supported by catalyst particles that extend through the lower end closure 55 of regeneration tower 10 and through the conduit 108.

The catalyst particles are periodically transferred by withdrawing a predetermined volume of catalyst from the bed 50 through the conduit 108 which in turn allows all the catalyst particles to slump downward through the previously-described zones. Catalyst is withdrawn from conduit 108 at a rate that creates a 1.0 hour residence time for a particle to pass from the top of the cylindrical section of annular baffle 52 to the bottom of the cylindrical section of annular baffle 52. Only a matter of seconds or minutes are required for substantially complete heat transfer to occur. The residence time of 1 hour is a consequence of the vessel geometry required to get approximately uniform gas distribution when using an annular gas distribution baffle, such as annular baffle 52. Although other structure is preferably present above upper nozzle 11 and below the conduit 108, such structure has no bearing on the present invention and need not be described, except as already described as needed to statically support the catalyst particles in bed 50 and to periodically transfer catalyst particles from the regeneration vessel 10.

An important aspect of the present invention is that a controlled flow rate of cooled, dried air can be allowed to enter the cooling zone bed 50 through an inlet nozzle 94 in order to permit the hot catalyst particles which have descended into bed 50 from the bed 38 to be cooled to a desired degree. The source of air is preferably the plant supply of compressed air, which is generally produced by drawing air from the atmosphere, compressing to a convenient and elevated pressure, and cooling to a temperature less than about 100° F., which is lower than the temperature of the catalyst leaving the catalyst bed 38. Air dryer 96 removes water from the cooled air. Control over the total amount of cooled, dried air admitted is by means of a flow control valve 100 operated by a flow controller 98.

A first portion of the cooled, dried air enters inlet 94 in order to cool the catalyst in the bed 50. The cooled dried air that enters the bottom of the cooling bed 50 is generally at a temperature of between about 50° F. (10° C.) to about 100° F. (38° C.), or cooler. The pressure at the air inlet into the cooling bed 50 is generally between about 0 psig (0 kg/cm$^2$ g) to about 50 psig (3.5 kg/cm$^2$ g). Preferably, the pressure of the cooling bed 50 is any convenient pressure of the vessel with which it is associated, which, in this case, is the regeneration vessel 10. The pressure of the cooling bed 50 is generally not limited by cooling considerations, because heat transfer between solid particles and a gas is not strongly dependent on pressure. One skilled in the art is able to compute the heat transfer coefficient between the air and the catalyst particles for any pressure of the cooling bed 50. This first portion is preferably distributed downwardly through an annular chamber 54 that is defined by the annular baffle 52 and the wall of the regeneration vessel 10. At the bottom of the cylindrical section of the annular baffle 52, the cooling air reverses direction and flows nearly uniformly upwardly in a counterflow manner through the cooling zone bed 50. The ratio of the thermal flow rate of the cooling air to the thermal flow rate of the catalyst is less than 0.9 or greater than 1.15, and preferably it is less than 0.85 and greater than 1.20. The pressure difference from the bottom to the top of the cooling zone bed 50 that results from the flow of air is generally less than the average bulk density of the catalyst particles, and preferably less than one-half of the average bulk density of catalyst particles. The air that reaches the top of the cooling zone bed 50 exits through nozzle 86 and into a first conduit 88. From the previous description, catalyst particles reach cylindrical bed 50 from cylindrical bed 38 by passing through an annular bed 45, and some of the air that reaches the top of the cooling zone bed does flow through the annular bed 45 and into the cylindrical, drying zone bed 38. Preferably, however, the restriction to gas flow through the packed bed of catalyst in the annular bed 45 is relatively large in comparison to the restriction to the gas flow through the conduits 88, 90, the heater 84, the nozzle 82, and the annular chamber 40, none of which contain catalyst. So, most of the air that reaches the top of the cooling zone bed exits through the nozzle 86.

The air that exits the top of the cooling bed 50 is generally at a temperature of between about 980° F. (527° C.) to about 1020° F. (549° C.). Preferably, the temperature of the air that exits the cooling bed 50 is nearly at the temperature of the catalyst that enters the cooling bed 50. For example, the temperature of the exiting air may be within 1°–5° F. (1°–3° C.) of the entering catalyst particles. In general, the difference in temperature between the exiting air and the entering catalyst particles depends on the superficial velocity of the air through the cooling bed 50: the lower the velocity, the lower is the temperature difference, and likewise the higher the velocity, the higher is the temperature difference. The pressure of the air leaving the top of the cooling zone bed 50 is generally between about 1.0 psig (0.1 kg/cm$^2$ g) to about 50 psig (3.5 kg/cm$^2$ g), although, as described previously, the pressure is conveniently determined by the pressure of the regeneration tower 10. The air that exits through the nozzle 86 and into the conduit 88 combines with a second portion of the cooled, dried air. The second portion of the cooled, dried air stream is regulated by means of a flow control valve 92 operated by the temperature sensor/controller 106. The second portion combines with the air passing through the conduit 88, and the combined stream flows through the conduit 90 into an air heater 84. The heated, combined stream passes through a conduit and into the regeneration vessel 10 through the nozzle 82. Preferably, the air heater 84 is an electric air heater, and a temperature controller senses the temperature of the heated, combined stream that leaves the air heater 84 and adjusts an electric power control for the air heater 84.

The heated, combined air stream enters inlet 82 in order to dry the catalyst in the bed 38. The heated, combined stream that enters the bottom of the drying zone bed 38 is at a temperature that depends on the affinity of the catalyst particles for water, with a higher temperature generally being preferred for more drying when the catalyst's affinity for water is greater. Preferably, the heated, combined stream is at a temperature of between about 1000° F. (538° C.) to about 1050° F. (566° C.). The pressure in the drying zone bed 38 is generally between about 1.0 psig (0.1 kg/cm$^2$ g) to about 50 psig (3.5 kg/cm$^2$ g). In general, the pressure also depends on the affinity of the catalyst particles for water, with a lower pressure generally being preferred for more drying when the catalyst's affinity for water is greater. Preferably, however, the pressure of the drying zone bed 38 is determined by the pressure of the regeneration tower 10. The heated, combined air stream is preferably distributed downwardly through the annular chamber 40 that is defined by the annular baffle 42 and the wall of the regeneration vessel 10. At the bottom of the cylindrical section of the annular baffle 42, the heated, combined air stream reverses direction and flows nearly uniformly upwardly in a counterflow manner through the drying zone bed 38.

Most of the air that reaches the top of the drying zone bed 38 enters the annular space above the drying zone bed that is formed by the wall of the regeneration tower 10, a horizontal annular baffle 32, and the cylindrical baffle 28. A first portion of the air that reaches the top of the catalyst drying zone bed 38 passes through the horizontal, annular baffle 32, which is perforated with holes for gas flow, and into an annular chamber 30, which is defined by the wall of the regeneration tower 10 and the vertical, cylindrical baffle 28. A second portion of the air that reaches the top of the catalyst drying zone bed 38 is vented through nozzle 110. The amount of air which is vented through nozzle 110 is controlled by a valve 112. In principle, a third portion of air that reaches the top of the catalyst drying zone bed 38 could flow through the annular bed 35 and into the cylindrical, drying zone bed 38, since, as described above, catalyst particles reach cylindrical bed 50 from cylindrical bed 38 by passing through an annular bed 35. Preferably, however, the restriction to gas flow through the packed bed of catalyst in the annular bed 45 is relatively large in comparison to the restriction to the gas flow through the baffle 32, and the annular chambers 30 and 33, none of which contain catalyst. So, most of the air that reaches the top of the drying zone bed 38 exits either through the nozzle 110 or through the holes in the baffle 32.

The air which passes through the baffle 32 is combined with a halogenation agent in the annular chamber 30. The halogenation agent, such as an organic chloride, is generally supplied as a liquid by an injection pump from bulk containers of organic chloride, and such means are not an essential part of this invention. The liquid organic chloride passes through a conduit 76 and a steam heater 78 that vaporizes the organic chloride, which enters the regeneration tower 10 through the nozzle 80. In the annular chamber 30, the entering organic chloride vapor mixes with the upflowing air stream to produce the halogenation gas. At the top of the cylindrical baffle 28, the halogenation gas reverses direction and begins to flows downwardly through the annular chamber 33 that is defined by the baffles 28 and 26. At this point, the halogenation gas stream enters the catalyst bed 24 in essentially the same manner as the first portion of the air stream enters the catalyst bed 50. The halogenation gas is preferably distributed downwardly through the annular chamber 33. At the bottom of the cylindrical section of the annular baffle 26, the halogenation gas reverses direction and flows uniformly upwardly in a counterflow manner through the halogenation bed 24.

When the halogenation gas reaches the top of the bed 24, it will exit into an open chamber 23 defined by the inner wall of the screen 16 and at an elevation below the location of the baffle 22. As the halogenation gas moves up through open chamber 23, it will mix with the radially inwardly flowing flue gas exiting the screen 16. The flue gas exiting the reheating zone bed 21 has essentially the same oxygen content as the gas that enters the reheating zone bed 21. This is because essentially no combustion of coke occurs in the reheating zone bed 21, which has the purpose of only heating the catalyst exiting the burn zone bed 14.

The mixture of the halogenation gas and the flue gas exiting the reheating zone bed 21 move upward into a chamber 20, which is defined by the inner wall of the screen 16 and at an elevation above the location of the baffle 22. As the mixture moves upward through open chamber 20, it will mix with the radially inwardly flowing flue gas exiting the screen 16 above the baffle 22. The flue gas exiting the burn zone bed 14 has a relatively high temperature and substantially no oxygen content after having contacted the coke-covered catalyst within the burn zone bed 14. However, by mixing the gas mixture with the flue gas, a recycle gas mixture is produced. The recycle flue gas, which will have a variable oxygen content and a relatively high temperature, depending upon the portion of air in it, is delivered through the exit nozzle 60 and a conduit to a blower or fan 62.

The blower 62 forces a first portion of the recycled flue gas through a conduit 74 and an nozzle 76 into the regeneration tower 10 below the elevation of the baffle 22. This first portion, having a relatively high temperature, heats the reheating zone bed 21 containing catalyst after it has exited the bed 14 and before it enters the bed 24. The blower forces a second portion of the recycled flue gas through a conduit 64, a regeneration cooler 66, and an electric heater 68. The regeneration cooler 66 and the electric heater 68 operate in combination to ensure that the temperature of the gas entering the burn zone bed 14 is constant. In the event that the temperature of the recycle flue gas exceeds the desired inlet temperature, the regeneration cooler removes the heat of combustion from the second portion of the recycled flue gas by heat exchanging the recycled flue gas with atmospheric air. On the other hand, in the event that the temperature of the recycle flue gas is less than the desired inlet temperature, the electric heater 68 reheats the flue gas to the desired temperature. Preferably, a temperature controller senses the temperature of the recycled flue gas just before it re-enters the regeneration tower 10 through the inlet 72 and controls, as needed, either a regulating valve on the atmospheric air to the regeneration cooler 66 or the electric power control to the electric heater 68. The flue gas enters past an oxygen analyzer 70, and into the inlet nozzle 72 of the burn zone bed 14.

Assuming that it is desired that the recycle flue gas or combustion gas entering the nozzle 72 has an oxygen content of 0.8%, for example, a signal may be generated by the oxygen analyzer 70 to be used to control the operation of the valve 112 to vent a greater or lesser amount of the drying air in drying zone bed 38 through exit nozzle 1 10. The types of controls, analyzers, and valves used are conventional and will not be described here. Venting more air through nozzle 110 will decrease the amount left to exit through the baffle 32 and will therefore cause a decrease in the oxygen content of the recycle flue gas leaving the exit nozzle 60. Likewise, venting less air through exit nozzle 110 will increase the oxygen content of the recycle flue gas. In a typical situation, the amount of air required by the halogenation zone bed 24 and for combustion in the burn zone bed 14 might be only about 50% of that required by the drying zone bed 38. The remainder would be vented.

Assuming that it is desired that the catalyst exiting the regeneration tower through the nozzle 104 has a desired temperature of 400° F. (200° C.), for example, a signal may be generated by the temperature sensor/controller 106 to be used to control the operation of the valve 92 to bypass a greater or lesser amount of the cooled, dried air through regulating valve 92. The types of controls, sensors and valves used are conventional and will not be described here. Bypassing more air through regulating valve 92 will decrease the amount left to pass through the cooling zone bed 50 and will therefore cause an increase in the temperature of the catalyst leaving the exit nozzle 104. Likewise, bypassing less air through regulating valve 92 will increase the amount left to pass through the cooling zone bed 50 and will decrease the temperature of the catalyst leaving the exit nozzle 104.

The method of controlling the catalyst outlet temperature described in the preceding paragraph is particularly well-suited for when a sustained thermal flow ratio in the cooling zone bed 50 of equal to or less than 0.85 is desired. On the other hand, if a sustained thermal flow ratio greater than 1.2 is desired, an alternative method of control is as follows. The changes that are necessary to implement this control scheme can best be described by referring to the diagram. First, the temperature sensor/controller for the catalyst exiting through the conduit 108 is replaced with a temperature sensor/controller for the heated air stream exiting through the nozzle 86 or the conduit 88. Second, the regulating valve 92 is eliminated, along with the conduit that permits cooled, dried air to bypass the cooling zone bed 50. And third, the control of the regulating valve 100 by a signal from the flow controller 98 is replaced by a signal from the temperature sensor/controller for the heated air stream exiting the nozzle 86. Then, assuming that it is desired that the heated air stream exiting the regeneration tower 10 through the nozzle 86 has a desired temperature of 400° F. (200° C.), for example, a signal may be generated by the temperature sensor/controller to be used to control the operation of the valve 100 to permit a greater or lesser amount of the cooled, dried air through regulating valve 100. Again, the types of controls, sensors and valves used are conventional and will not be described here. Permitting more air through regulating valve 100 will increase the amount to pass through the cooling zone bed 50 and will therefore cause a decrease in the temperature of the air stream leaving the exit nozzle 86. Likewise, permitting less air through regulating valve 100 will decrease the amount to pass through the cooling zone bed 50 and will increase the temperature of the gas leaving the exit nozzle 86. Alternatively, excess air could be passed through the cooling bed zone, withdrawn from the cooling zone, and vented from the process if the temperature of the air at the outlet of cooling zone increases too high. A high gas outlet temperature indicates that the thermal ratio is decreasing towards 1.0.

A variation of the method of control described in the preceding paragraph is preferred when a sustained thermal flow ratio in the cooling zone bed 50 of greater than 1.2 is desired. Again, the changes that are necessary to implement this control scheme can best be described by starting with the diagram. First, the temperature sensor/controller for the catalyst exiting through the conduit 108 is replaced with a temperature sensor/controller for the heated air stream exiting through the nozzle 86 or the conduit 88. Second, the regulating valve 92 is eliminated, along with the conduit that permits cooled, dried air to bypass the cooling zone bed 50. Instead of valve 92 and its bypass conduit, a conduit is used to vent from the process a portion of the heated air stream in the conduit 88, and this vent conduit is equipped with a regulating valve. And third, the control of the regulating valve in the vent conduit is by a signal from the temperature sensor/controller for the heated air stream exiting the nozzle 86. Then, assuming that it is desired that the heated air stream exiting the regeneration tower 10 through the nozzle 86 has a desired temperature of 400° F. (200° C.), for example, a signal may be generated by the temperature sensor/controller to be used to control the operation of the regulating valve in the vent conduit to permit a greater or lesser amount of the heated air stream to vent from the process. Again, the types of controls, sensors and valves used are conventional and will not be described here. Permitting more air through regulating valve in the vent conduit will increase the amount to pass through the cooling zone bed 50 and will therefore cause a decrease in the temperature of the air stream leaving the exit nozzle 86. Likewise, permitting less air through the regulating valve in the vent conduit will decrease the amount to pass through the cooling zone bed 50 and will increase the temperature of the gas leaving the exit nozzle 86. In this manner, excess air may be passed through the cooling zone bed 50, withdrawn from the cooling zone, and vented from the process if the temperature of the air at the outlet of cooling zone increases too high. In this control arrangement, a high gas outlet temperature indicates that the thermal ratio of air to catalyst particles is approaching 1.0.

From the preceding description, it will be apparent that the flow rate of cooling air through the cooling zone bed 50 may be regulated at a thermal flow ratio of gas to solid that is not near 1, even though the rate of air that might otherwise be required for drying or for combustion in the regeneration tower 10 might be 1. The flow of cooling air which can enter the cooling zone 50 through the inlet 94 can be controlled completely independently of the control means for the drying air entering through the inlet 82, the drying air that exits the regeneration tower 10 through the nozzle 110, and the combustion air entering inlet nozzle 72.

What is claimed is:

1. A method for cooling and inhibiting speckling of particles, said method comprising:
   (a) withdrawing particles containing a Group VIII noble metal from a first zone, at least periodically passing said particles to a second zone, forming in said second zone a packed bed of said particles, and at least periodically moving said bed to establish a particle thermal flow rate;
   (b) passing a first portion of a first gas stream through said bed and contacting said particles in said bed with said first portion at a gas flow rate that establishes a gas thermal flow rate such that the ratio of said gas thermal flow rate to said particle thermal flow rate in said bed is less than about 0.9 or more than about 1.15, thereby cooling said particles and producing a heated first portion;
   (c) withdrawing said heated first portion from said second zone, and combining said heated first portion and a second portion of said first gas stream to form a second gas stream;
   (d) heating said second gas stream to produce a heated second gas stream, passing said heated second gas stream to said first zone, and contacting said particles in said first zone with said heated second gas stream; and
   (e) at least periodically withdrawing cooled particles from said second zone.

2. The method of claim 1 further characterized in that said first gas stream comprises at least one of air, nitrogen, oxygen, and hydrogen.

3. The method of claim 1 further characterized in that said particles comprise at least one of alumina, silica, silica-alumina, titanium oxide, clay, alumino-silicates, and zeolites.

4. The method of claim 1 further characterized in that said first zone comprises a drying zone.

5. The method of claim 1 further characterized in that said first gas stream enters said second zone at a temperature of between about 50° F. and about 100° F., and a pressure of between about 1.0 psig and about 50 psig, and said heated first gas stream leaves said second zone at a temperature of between about 940° F. and about 1010° F., and a pressure of between about 1.0 psig and about 50 psig.

6. The method of claim 1 wherein the ratio of said gas thermal flow rate to said particle thermal flow rate in said second zone is less than about 0.85.

7. The method of claim 1 wherein the ratio of said gas thermal flow rate to said particle thermal flow rate in said second zone is more than about 1.2.

8. The method of claim 1 further characterized in that the temperature of said cooled particles is controlled to reduce thermal channelling in said second zone, said method comprising the steps of:
   (a) establishing a first signal representative of the desired outlet temperature;
   (b) establishing a second signal representative of the actual outlet temperature; and
   (c) comparing said first signal and said second signal and establishing a third signal, wherein said third signal is in response to the difference between said first signal and said second signal, wherein said third signal positions a valve operably located so as to control the flow of said second portion.

9. A method for cooling and inhibiting speckling of particles, said method comprising:
   (a) withdrawing particles containing a Group VIII noble metal from a first zone, at least periodically passing said particles to a second zone, forming in said second zone a packed bed of said particles, and at least periodically moving said bed to establish a particle thermal flow rate;
   (b) passing a first gas stream through said bed and contacting said particles in said bed with said first gas stream at a gas flow rate that establishes a gas thermal flow rate such that the ratio of said gas thermal flow rate to said particle thermal flow rate in said bed is less than about 0.9 or more than about 1.15, thereby cooling said particles and producing a heated first gas stream;
   (c) withdrawing said heated first gas stream from said second zone, heating said heated first gas stream to produce a twice-heated first gas stream, passing said twice-heated first gas stream to said first zone, and contacting said particles in said first zone with said twice-heated first gas stream; and
   (d) at least periodically withdrawing cooled particles from said second zone.

10. The method of claim 9 further characterized in that at least a portion of said heated first gas stream is vented from the process.

11. The method of claim 10 further characterized in that said temperature of said heated first gas stream is controlled to reduce thermal channelling in said second zone, said method comprising the steps of:
   (a) establishing a first signal representative of the desired temperature of said heated first gas stream;
   (b) establishing a second signal representative of the actual temperature of said heated first gas stream; and
   (c) comparing said first signal and said second signal and establishing a third signal, wherein said third signal is in response to the difference between said first signal and said second signal, and said third signal positions a valve operably located so as to control the flow of said portion of said heated first gas stream.

12. A method for effecting regeneration of and inhibiting speckling of catalyst particles used in hydrocarbon conversion reactions, said method comprising:
   (a) passing catalyst particles containing a Group VIII noble metal through a burn zone, by means of gravity, which is maintained at a coke-oxidizing temperature, wherein catalyst particles are contacted with a recycle gas comprising oxygen;
   (b) passing catalyst particles from said burn zone through a catalyst drying zone, by means of gravity, wherein water is removed from said catalyst particles;
   (c) passing catalyst particles from said catalyst drying zone to a catalyst cooling zone, by means of gravity, and forming a packed cooling bed of said particles in said catalyst cooling zone wherein the temperature of said catalyst particles is reduced;

(d) at least periodically moving catalyst particles through said burn zone, said catalyst drying zone, and said catalyst cooling zone to establish a catalyst thermal flow rate by withdrawing catalyst particles from said catalyst cooling zone and adding catalyst particles to said burn zone;

(e) compressing air drawn from the atmosphere to an elevated pressure to produce a compressed air stream;

(f) cooling said compressed air stream and passing said compressed air stream through an air drying zone, wherein water is removed from said compressed air stream to produce a dried air stream;

(g) passing a first portion of said dried air stream through said cooling bed and contacting said catalyst particles in said cooling bed with said first portion at an air flow rate that establishes an air thermal flow rate such that the ratio of said air thermal flow rate to said catalyst thermal flow rate in said cooling bed is less than 0.9 or more than 1.15, thereby cooling said catalyst particles and producing a heated air stream;

(h) combining said heated air stream from said catalyst cooling zone and a second portion of said dried air stream into a combined stream and heating said combined stream in an air heating zone;

(i) passing at least a portion of said combined stream from said air heating zone through said catalyst drying zone, thereby removing water from said catalyst particles;

(j) mixing at least a portion of the gas from said catalyst drying zone with gas exiting from said catalyst particles in said burn zone to form a flue gas stream;

(k) withdrawing said flue gas stream from said burn zone and discharging a first portion of said flue gas stream from said process; and (l) passing a second portion of said flue gas stream to said burn zone, thereby providing at least a portion of said recycle gas.

13. The method of claim 12 further characterized in that (a) said catalyst particles from said burn zone are passed through a halogenation zone, by means of gravity, wherein said particles are contacted with a halogenation gas comprising a halogen compound;

(b) catalyst particles from said halogenation zone are passed to said drying zone;

(c) at least a portion of the gas from said catalyst drying zone is combined with at least one of steam and a halogen compound to form said halogenation gas;

(d) said halogenation gas is passed through said halogenation zone; and (e) at least a portion of the gas from said halogenation zone is mixed with gas exiting from said catalyst particles in said burn zone to form said flue gas stream.

14. The method of claim 13 further characterized in that (a) said catalyst particles from said burn zone are passed through a catalyst heating zone, by means of gravity, wherein catalyst particles are contacted with at least a portion of said flue gas, thereby increasing the temperature of said catalyst particles;

(b) catalyst particles from said catalyst heating zone are passed to said halogenation zone;

(c) at least a portion of the gas from said halogenation zone is mixed with gas exiting from said catalyst particles in said catalyst heating zone to form an effluent gas stream; and (d) at least a portion of said effluent gas stream is mixed with gas exiting from said catalyst particles in said burn zone to form said flue gas stream.

15. The method of claim 14 wherein the ratio of said air thermal flow rate to said catalyst thermal flow in said catalyst cooling zone is less than 0.85 or more than 1.2.

16. The method of claim 14 further characterized in that cooled catalyst particles are withdrawn from said catalyst cooling zone by means of gravity, and the temperature of said cooled catalyst particles is controlled to reduce thermal channelling in said catalyst cooling zone, said method comprising the steps of:

(a) establishing a first signal representative of the desired outlet temperature;

(b) establishing a second signal representative of the actual outlet temperature; and (c) comparing said first signal and said second signal and establishing a third signal, wherein said third signal is in response to the difference between said first signal and said second signal, wherein said third signal positions a valve operably located so as to control the flow of said second portion of said dried air stream.

* * * * *